Jan. 17, 1967 E. R. DUDLEY 3,299,323
ELECTRICAL CONTROL DEVICE WITH INTERCONNECTED
MAIN AND SUB-CHASSIS
Filed Sept. 1, 1964 2 Sheets-Sheet 1

INVENTOR.
EDMOND R. DUDLEY
BY
ATTORNEY

Jan. 17, 1967   E. R. DUDLEY   3,299,323
ELECTRICAL CONTROL DEVICE WITH INTERCONNECTED
MAIN AND SUB-CHASSIS
Filed Sept. 1, 1964   2 Sheets-Sheet 2
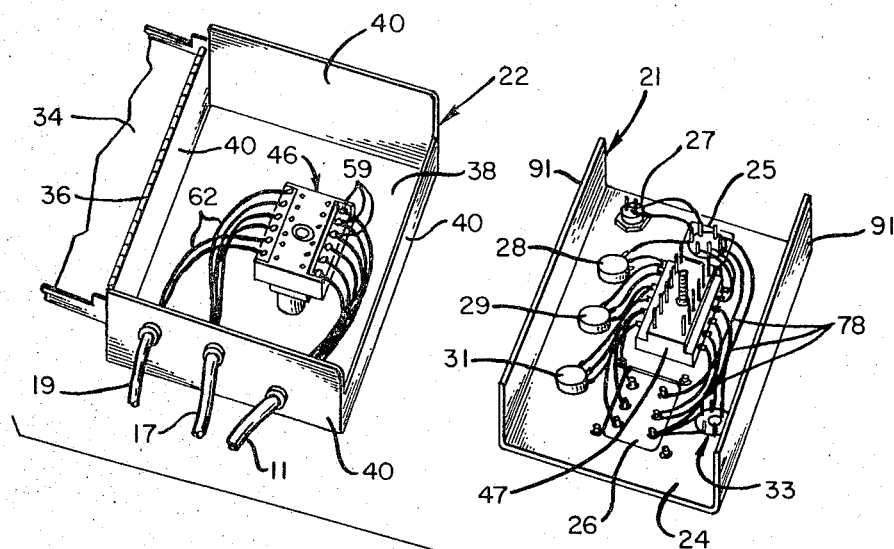
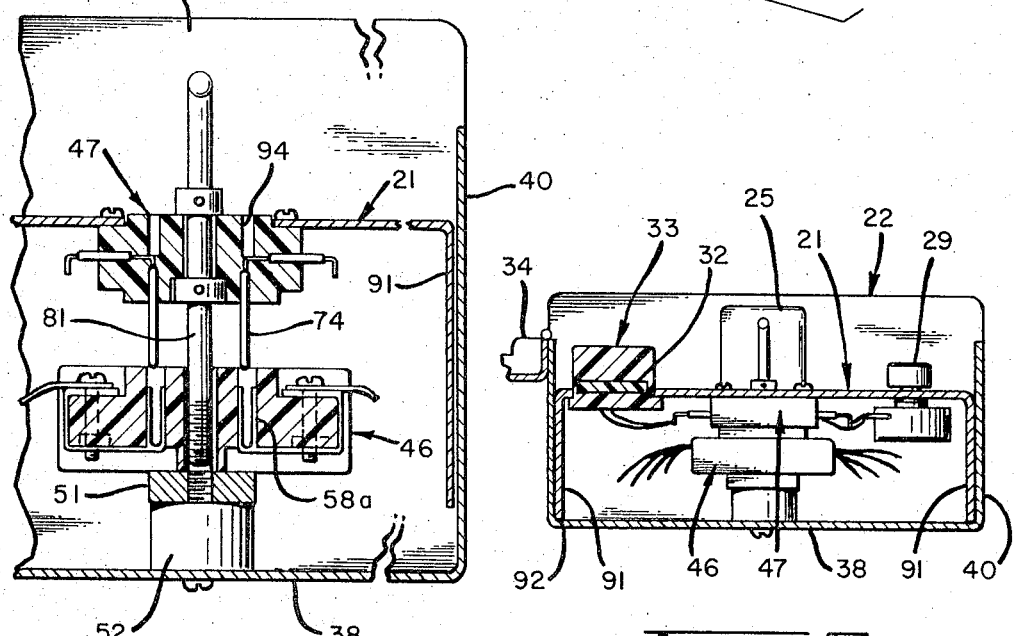
INVENTOR.
EDMOND R. DUDLEY
BY Edward B. Gregg
ATTORNEY

United States Patent Office 3,299,323
Patented Jan. 17, 1967

3,299,323
ELECTRICAL CONTROL DEVICE WITH INTERCONNECTED MAIN AND SUB-CHASSIS
Edmond R. Dudley, Santa Clara, Calif., assignor to Peco Corporation, Mountain View, Calif., a corporation of California
Filed Sept. 1, 1964, Ser. No. 393,562
8 Claims. (Cl. 317—99)

This invention relates to a flow control system and more particularly to such a system which includes a main chassis with permanent wiring, and a modular sub-chassis which is readily removably connected thereto. In particular, the invention relates to connecting means for mechanically interconnecting the chassis and electrically interconnecting circuits carried thereby or connected thereto.

Control systems for use in the control of can making machinery and canning machinery are well known, which systems provide means for regulating and controlling the movement of cans. For example, with such systems the existence or nonexistence of motion of can bodies and voids in a moving can line may be sensed, and the can making or filling machines appropriately controlled. An example of a control system is shown in Patent No. 3,018,437 by Edmond R. Dudley issued January 23, 1962.

A typical control system includes a sensing head for sensing the cans and a control unit to which the sensing head is electrically connected. A source of power and the motor to be controlled are also connected to the control unit. In accordance with this invention, the control unit comprises a main chassis or base having a detachable sub-chassis. The main chassis carries one member of a two-part electrical connector to which said motor and sensing head are electrically connected. The other electrical connector member is attached to the sub-chassis upon which electrical control circuit components are also mounted. The control unit circuit carried by the sub-chassis is interconnected with said sensing head and motor when said connector members are coupled together. The sub-chassis module may be removed without disturbing the wiring to the main chassis.

An object of this invention is the provision of an improved control system of the type described above.

An object of this invention is the provision of a control system which is useful in the control of can handling machinery, which system includes a readily removable circuit module of a design which greatly facilitates installation, checking and repair thereof.

An object of this invention is the provision of an improved two-part connector and particularly to a novel releasable coupling means for interconnecting the two connector parts.

An object of this invention is the provision of a novel electrical connector member which is adapted for mounting on a panel or the like which connector member has terminals at one side of the panel and includes means for electrically checking the terminals from the other side thereof.

These and other objects and advantages will become apparent from the following description when taken with the accompanying drawings. It will be understood that the drawings are for purposes of illustration and are not to be construed as defining the scope or limits of the invention, reference being had for the latter purposes to the appended claims.

In the drawings wherein like reference characters denote like parts in the several views:

FIGURE 4 is a perspective view which is similar to FIGURE 1 but showing the sub-chassis module removed from the case and in an inverted position;

FIGURE 5 is a view which is similar to FIGURE 2 but showing the connector members in the process of being connected together; and FIGURE 6 is a cross sectional view taken on line 6—6 of FIGURE 1.

Figure 1:
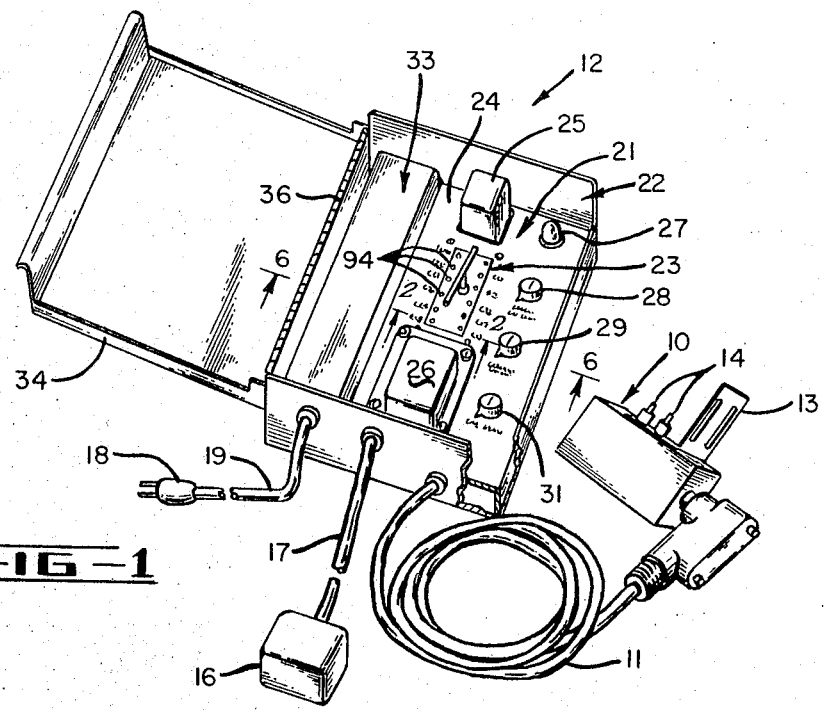
FIGURE 1 is a perspective view of a control system embodying this invention.

Referring now to FIGURE 1 there is shown a control system which includes a sensing head 10 connected by a cable 11 to a control unit 12. The sensing head 10 may be placed adjacent a can line to sense the existence or nonexistence of motion of cans, to sense the presence or absence of voids in the can line, or the like. A bracket 13 attached by studs 14 to the sensing head provides means for mounting the head adjacent a conveyor or the like along which the cans or other metal containers not shown are advanced. A motor 16 (shown in block diagram form) for actuation of a machine such as a can filler or the like not shown may be controlled by the apparatus of this invention. In FIGURE 1 the motor is connected by cable 17 to the control unit. The circuit is powered by a suitable supply source connected thereto through a plug 18 and cable 19.

The detailed circuitry of the system forms no part of this invention, and any suitable circuit such as that shown in the above mentioned Patent No. 3,018,437 may be employed. In accordance with this invention, however at least some of the circuit elements or components are mounted on a sub-chassis 21 which is readily attachable to and removable from the main chassis designated 22 through a novel two-part connector designated 23.

The sub-chassis module 21 includes a control panel 24 upon which there may be mounted a plug-in relay 25, transformer 26, signal light 27, time delay control potentiometers 28 and 29, a sensitivity control potentiometer 31, and an encapsulated circuit board 32 (see FIGURE 6) bearing other circuit elements such as transistors, capacitors, resistors, etc., not shown. The insulated encapsulated circuit is generally designated by the reference character 33.

In the illustrated embodiment of the invention the main chassis 22 is shown comprising a box-like cabinet or case with a cover 34 pivotally attached to one side wall thereof by a hinge 36. The cabinet as best seen in FIGURE 4 includes a bottom 38 with upwardly extending side walls 40. One part 46 of the two-part connector 23 is attached to the bottom 38 of the cabinet while the other part 47 thereof is attached to the underside of the top panel 24 of the sub-chasis 21. In the illustrated arrangement the parts 46 and 47 comprise female and male connector members respectively which are interconnected when the sub-chassis is coupled to the main chassis as illustrated in FIGURES 1 through 3 and FIGURE 6.

Figures 2, 3:
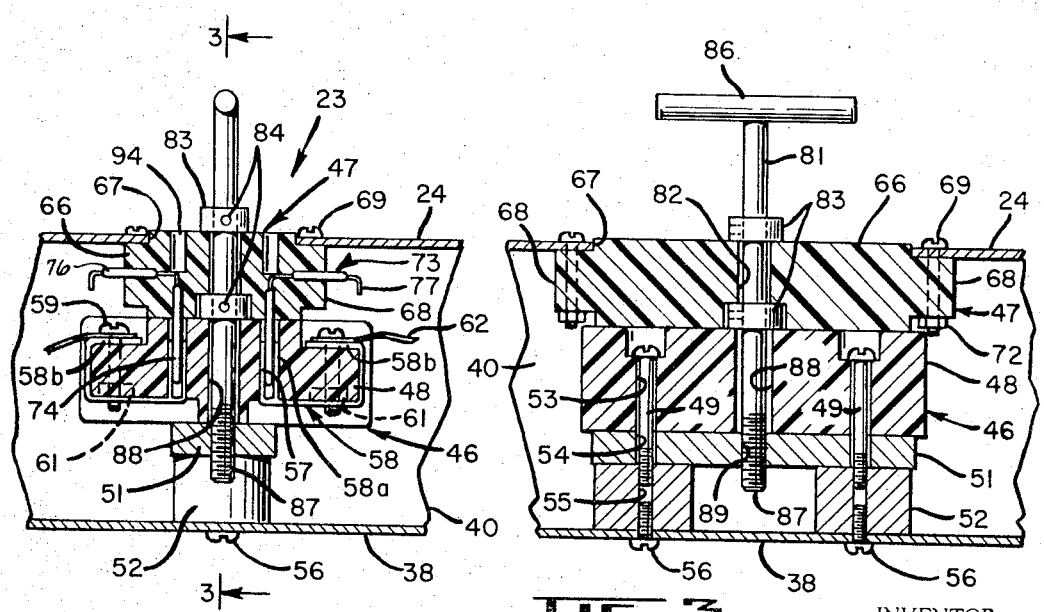
FIGURE 2 is a fragmentary cross sectional view taken on line 2—2 of FIGURE 1.
FIGURE 3 is a cross sectional view taken along line 3—3 of FIGURE 2.

The connector 23 is best shown in FIGURES 2 and 3 of the drawings to which reference is now made. The female member 46 may be of substantially well known design and is shown comprising a generally rectangular shaped block 48 of insulating material attached by screws 49 to a base comprising an elongated flat bar 51 supported on legs 52 at opposite ends thereof. The screws 49 extend through recessed clearance holes 53 in the insulating block 48, through clearance holes 54 in the bar 51 and then threadedly engage tapped holes 55 in the legs 52. Screws 56 extending upwardly through holes in the bottom 38 of the cabinet threadedly engage the tapped holes 55 in the legs thereby securing the same to the bottom of the chassis.

The insulating block 48 is formed with two rows of holes 57. Electrical contact members 58 are carried by the insulating block 48, and since all of the contact members are of the same design a description of one will be applicable to each of them. Each contact member includes a socket element 58a which extends into a hole 57 from the bottom end thereof and terminates there within a spaced distance from the top of the hole. The contact members are bent outwardly, upwardly then inwardly about opposite side edges of the insulating block and terminate in upwardly facing terminal portions 58b. Screws 59 extend through holes in the terminal portion and engage captive nuts 61 which are held in recesses in the bottom of the insulating block by the outwardly extending portion of said terminals. As best seen in FIGURE 4, wires 62 of the cables 11, 17 and 19 leading to and from the sensing head 10, motor 16 and power source are attached by the screws 59 to the terminals 58b. With the sub-chassis 21 removed from the cabinet the connection of the wires 62 is easily accomplished since the upwardly facing screws 59 and the terminals 58b are readily accessable. Once the system is installed in the can line there ordinarily is seldom any need to remove the wires from the terminals.

The other part 47 of the two-part connector member 23 is of novel construction and includes a generally rectangular shaped block 66 of insulating material attached to the undersurface of the control panel 24. The upper end of the block 66 extends through an opening 67 in the panel 24 and a flange 68 on the block 66 abuts the bottom of the panel about the opening. In the illustrated arrangement the upper surface of the block is substantially even with the upper surface of the panel 24. Bolts 69 extend through holes in the panel and holes in the flange 68 and engage nuts 72 at the bottom of the flange to fasten the block to the panel.

The insulating block 66 carries two rows of electrical contact members generally designated 73 which are adapted for cooperation with the contact members 58 carried by the block 48. All of the contact members 73 are of the same construction whereby a description of one applies to each of them. Each contact member 73 includes a pin element 74 which extends downwardly from the bottom of the insulating block. The contact members are embedded in the insulating block and each includes a generally horizontal portion 76 which extends from the upper end of the pin element 74. One row of contact members extends outwardly from one side of the insulating block while the other row extends outwardly from the opposite side of the block. It will be noted that the contact members 73 are positioned beneath the panel 24 and that no portion thereof extends above the panel. The outer free ends of the contact members are shown bent downwardly to provide soldering terminals 77 for the connection of circuit wires 78 thereto (the circuit wires 78 shown in FIGURE 4 of the drawings being connected to various circuit elements carried by the sub-chassis module 21). It will be apparent that when the connector parts 46 and 47 are coupled together various combinations of the wires 62 and 78 are interconnected through the contact members 58 and 73 respectively.

In accordance with this invention a coupling means which includes a screw 81 extending through a bore 82 in the male connector member 47 is included for detachably connecting the connector members 46 and 47. The screw 81 is rotatably supported in the bore 82, and collars 83 at opposite sides of the insulating block 66 function to secure the screw to said block. Set screws 84 fix the collars to the screw. The bottom end of the hole 82 is counterbored for the reception of the inner collar to prevent interference between said inner collar and the block 48 when the connector members are coupled together.

The ends of the screw 81 extend outwardly from the block 66. A handle 86 is provided at the outer end thereof, and the inner end is threaded as at 87. A clearance hole 88 for the screw 81 is formed through the insulating block 48 of the female connector member, and an axially aligned tapped hole 89 is provided in the bar 51 for the reception of the screw. When the coupling screw 81 is threaded into the tapped hole 89 by rotation of the handle 86, the pin and socket elements 74 and 58a of the connector member contacts are brought into engagement as illustrated in FIGURE 2. In the illustrated arrangement the panel 24 of the sub-chassis module has a clearance fit with the walls 40 of the cabinet whereby relative rotation of said sub-chassis and cabinet is prohibited during application and removal of the sub-chassis module from the cabinet. Further, as best seen in FIGURE 5 when plugging in a module 21, the screw 81 threadedly engages the tapped hole 89 before the pins 74 engage the socket 58a. Several turns of the screw are required before engagement between said pins and sockets. The pins and sockets therefore are maintained in axial alignment during engagement and disengagement of the subchassis module from the main chassis. That is, they are brought into axial alignment prior to engagement therebetween and the axial alignment is maintained during such engagement. In this manner, bending of the pins or spreading of the sockets through misalignment is prevented.

The connector members 47 and 46 are preferably offset from the center of the panel 24 and cabinet 22, respectively, to prevent inadvertent reverse positioning of the connector members. In the illustrated arrangement the edges of the panel 24 are bent downwardly as at 91 to form a channel-shaped sub-chassis with downwardly extending legs. Preferably, the bottom edges 92 of the legs abut the bottom 38 of the case (as seen in FIGURE 6) when the connector members 46 and 47 are fully engaged. With this arrangement, added rigidity is provided to the sub-chassis when coupled to the case.

It will be noted that when the sub-chassis module 21 is plugged into the cabinet, the wiring for the apparatus is completely enclosed beneath the sub-chassis panel. Even when the cover 34 is opened there is no exposed wiring. This is a highly desirable safety feature. Often ordinances or codes of a community provide that only an electrician can open a cabinet in which wiring is exposed. An obvious advantage of the illustrated arrangement then, is that any operator, including non-electricians, can open the cover 34 and make the necessary time delay and sensitivity adjustments by means of the potentiometers 28, 19 and 31. Further, with this plug in arrangement maintenance time may be greatly reduced since the entire sub-chassis may be unplugged and replaced with a spare sub-chassis in the event of failure of the system to quickly ascertain whether-or-not the fault is in the circuit carried by the sub-chassis. No wires are disturbed by this substitution and the interchange is accomplished easily by unskilled persons. This quick change feature is particularly significant when it is understood that the operating time of a can line is often very expensive. With this quick change arrangement, losses due to down time because of failure of the control unit are greatly minimized. In addition, with this modular construction, different models of control unit sub-chassis may be employed in a cabinet without necessarily rewiring the cabinet.

Further in accordance with this invention means are provided for electrically checking the connector terminals (and thereby the electrical circuits connected thereto) while the sub-chassis is plugged into the main chassis without removal of the same therefrom. As seen in FIGURES 1, 2, 3 and 5, bores 94 are formed in the outer face of the insulating block 66 of the male connector member 47 and communicate with the electrical terminals 73. The bores or holes may simply be molded in the insulating block during the production thereof. They are of a sufficient diameter to accommodate a probe end whereby without removing the sub-chassis from the cabinet, an electrician or skilled operator may test the circuits of the system while all of the circuits are interconnected. Thus, the various circuits which are connected through the terminals of the novel connector may be tested. In one arrangement which has been built the test circuits include: signal to sensor 10; signal from sensor 10; transformer 26; capsulated circuit board 33; and relay 25. With this arrangement, the need to simulate circuits on the bench may be eliminated.

The invention having been described in detail in accordance with the requirements of the patent statutes, various changes and modifications may be suggested to those skilled in this art. For example, some of the circuit elements such as the transformer 26 may be mounted in the cabinet 22 rather than on the sub-chassis module 21. Also, the cabinet may be made of a sufficiently large size to accommodate additional sub-chassis modules or other electrical apparatus as desired. It may then be necessary to guide the sub-chassis module into proper alignment with the associated connector by hand. In this case, however, the parallel relation of the connector pins and sockets is still maintained by the interconnection of the screw 81 with the bar 51 prior to and during engagement of said pin and socket elements. As a further modification, the cabinet 22 may be dispensed with entirely and the female connector member 47 mounted on a panel or other suitable surface or support. It is intended that these and other such changes and modifications shall fall within the spirit and scope of the invention defined in the appended claims.

I claim:
1. In an electrical assembly which includes a main chassis with wiring and a removable sub-chassis with electrical components thereon, an electrical connector comprising first and second detachable electrical connector members, said sub-chassis including a panel having inner and outer sides and formed with a hole therein, means attaching said first electrical connector member to said panel with said member covering the hole therein, means attaching said second electrical connector member to said main chassis, an elongated connecting member attached to said first electrical connector member and extending outwardly from the front and back thereof and through the hole formed in said panel, means for detachably connecting the inner end of said elongated connecting member to said main chassis to thereby interconnect said first and second detachable electrical connector members for electrical connection of said main chassis wiring with said sub-chassis electrical components at the inner side of said panel, and means for electrically checking said electrical connector from the outer side of said panel through said hole formed therein.

2. The combination as defined by claim 1 wherein said first electrical connector member is attached to the back of said panel, said first and second detachable electrical connector members including a plurality of interconnectable contact elements which are interconnected when said connector members are interconnected, and said means for electrically checking said electrical connector including means forming a plurality of bores in said first electrical connector member extending from the front thereof to said contact members carried thereby through which bores a probe may be extended.

3. The combination defined by claim 1 wherein said means for electrically checking said electrical connector includes means forming bores in said first connector member extending from the outer face thereof which communicate with electrical terminals therein through which bores a probe may be extended for electrically checking said terminals.

4. In combination; a panel having an aperture extending therethrough, electrical circuit means carried by the panel, a first insulating member attached to said panel and closing the aperture, a first conductive terminal carried by said insulating member at the inner side of said panel, said insulating member being formed with a bore extending from the exterior thereof to said terminal through which a probe may be extended from the outer side of the panel for electrically checking said terminal.

5. The combination defined by claim 4 wherein said first conductive terminal is embedded in the said first insulating member and extends therefrom at only the inner side of said panel.

6. The combination defined by claim 4 in which said insulating member and terminal comprise one part of a two-part connector, said terminal being formed with a contact adapted for engagement with another contact carried by the other part of said two-part connector.

7. The combination defined by claim 4 in which said first insulating member comprises one part of a two-part connector which includes a second insulating member and second conductive terminal carried thereby and adapted for connection with said first terminal when the said first and second insulating members are connected together, a chassis, means securing said second insulating member to said chassis, and separable screw fastening means extending through substantially the center of said first and second insulating members for interconnecting the same.

8. In an electrical assembly which includes a main chassis with wiring and a removable sub-chassis with electrical components thereon;
an electrical connector comprising first and second detachable electrical connector members having interconnectable contact elements connected to said sub-chassis electrical components and main chassis wiring, respectively,
said sub-chassis including a panel having inner and outer sides and formed with a hole therethrough,
means attaching said first electrical connector member to said panel with said member covering the hole therein,
means attaching said second electrical connector member to said main chassis,
means for removably attaching the sub-chassis to the main chassis for detachably interconnecting the first and second electrical connector members for electrical connection of said main chassis wiring with said sub-chassis electrical components at the inner side of said panel, and
means for electrically checking said electrical connector from the outer side of the panel through said hole formed in said panel.

References Cited by the Examiner
UNITED STATES PATENTS

| | | | |
|---|---|---|---|
| 2,209,213 | 7/1940 | Vernon. | |
| 2,491,696 | 12/1949 | Venditti | 317—99 X |
| 2,625,591 | 1/1953 | George | 317—99 |
| 3,032,709 | 5/1962 | Dudley | 324—41 |
| 3,152,405 | 10/1964 | Halisky et al. | 324—149 X |
| 3,209,302 | 9/1965 | Uberbacher | 339—92 X |
| 3,234,433 | 2/1966 | Braunagel | 174—68.5 |

ROBERT K. SCHAEFER, *Primary Examiner.*

M. GINSBURG, *Assistant Examiner.*